United States Patent
Le Floch

(10) Patent No.: US 7,478,241 B2
(45) Date of Patent: Jan. 13, 2009

(54) MESSAGE INSERTION AND EXTRACTION IN DIGITAL DATA

(75) Inventor: Hervé Le Floch, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 962 days.

(21) Appl. No.: 09/910,929

(22) Filed: Jul. 24, 2001

(65) Prior Publication Data

US 2002/0013903 A1 Jan. 31, 2002

(30) Foreign Application Priority Data

Jul. 25, 2000 (FR) .................................. 00 09727

(51) Int. Cl.
*H04L 9/00* (2006.01)
(52) U.S. Cl. .................................................. 713/176
(58) Field of Classification Search .................. 713/176
See application file for complete search history.

(56) References Cited

U.S. PATENT DOCUMENTS

| | | | | |
|---|---|---|---|---|
| 5,293,590 | A * | 3/1994 | Keener et al. ............... | 710/316 |
| 5,303,236 | A * | 4/1994 | Kunimoto et al. ........... | 370/398 |
| 5,613,004 | A * | 3/1997 | Cooperman et al. .......... | 380/28 |
| 5,727,092 | A * | 3/1998 | Sandford, II et al. ........ | 382/251 |
| 5,889,868 | A * | 3/1999 | Moskowitz et al. ......... | 713/176 |
| 5,915,027 | A * | 6/1999 | Cox et al. .................... | 380/54 |
| 6,104,826 | A * | 8/2000 | Nakagawa et al. .......... | 382/100 |
| 6,185,312 | B1 * | 2/2001 | Nakamura et al. .......... | 382/100 |
| 6,360,000 | B1 * | 3/2002 | Collier ....................... | 382/100 |
| 6,442,283 | B1 * | 8/2002 | Tewfik et al. ............... | 382/100 |
| 6,459,685 | B1 * | 10/2002 | Mahe ......................... | 370/313 |
| 6,693,965 | B1 * | 2/2004 | Inoue et al. ............ | 375/240.19 |
| 2001/0026616 | A1 * | 10/2001 | Tanaka ....................... | 380/202 |

FOREIGN PATENT DOCUMENTS

| EP | 0 840 513 | A2 | 5/1998 |
|---|---|---|---|
| EP | 0 891 071 | A2 | 1/1999 |
| EP | 0 840 513 | A3 | 5/2000 |

(Continued)

OTHER PUBLICATIONS

Su, P., et al., "Digital Watermarking on EBCOT Compressed Images", Part of the SPIE Conference on Applications of Digital Image Processing XXII, Denver, Colorado, SPIE Vol. 3808, Jul. 1999, pp. 313-324.

(Continued)

*Primary Examiner*—Emmanuel L. Moise
*Assistant Examiner*—Jeffrey D Popham
(74) *Attorney, Agent, or Firm*—Fitzpatrick, Cella, Harper & Scinto

(57) ABSTRACT

The invention relates to a method of inserting a message into digital data representative of physical quantities, the message including ordered symbols, including the steps of:
  segmenting (E2) the data into regions,
  associating (E3) at least one region with each symbol to be inserted,
  characterized in that, for each region into which a symbol in question is to be inserted, it includes the steps of:
  determining (E7) a pseudo-random function, from a key which depends:
    on an initial key, and
    on the length of the message,
  modulating (E8) the symbol in question by the previously determined pseudo-random function in order to supply a pseudo-random sequence,
  adding (E10) the pseudo-random sequence to the region in question.

10 Claims, 14 Drawing Sheets

FOREIGN PATENT DOCUMENTS

JP           2001275115 A  *  10/2001

OTHER PUBLICATIONS

Podilchuk, C.I., et al., "Digital Image Watermarking Using Visual Models", Proceedings of the SPIE, vol. 3016, Feb. 10, 1997, pp. 100-111.

Hartung, F. et al., "Watermarking of uncompressed and compressed video", Signal Processing vol. 66 (1998), pp. 283-301.

Meng, J. et al. "Embedding Visible Video Watermarks in the Compressed Domain", International Conference on Image Processing and Its Applications, London, Great Britain, vol. 1, No. 4, Oct. 4, 1998, pp. 474-477.

* cited by examiner

| $S_0$ $R_0$ | $S_1$ $R_1$ | $S_2$ $R_2$ | $S_0$ $R_3$ |
|---|---|---|---|
| $K_{init}$ | $K_{init}+1$ | $K_{init}+2$ | $K_1 = K_{init}+N$ |
| $S_1$ $R_4$ | $S_2$ $R_5$ | $S_0$ $R_6$ | $S_1$ $R_7$ |
| $K_1+1$ = $K_{init}+N+1$ | $K_1+2$ = $K_{init}+N+2$ | $K_2 = K_1+N$ = $K_{init}+2N$ | $K_2+1$ = $K_{init}+2N+1$ |

*Figure 10*

| $S_0\ R_0$ | $S_1\ R_1$ | $S_2\ R_2$ | $S_0\ R_3$ |
|---|---|---|---|
| $K_{init}$ | $K_{init}$ | $K_{init}$ | $K_{init}+1$ |
| $S_1\ R_4$ | $S_2\ R_5$ | $S_0\ R_6$ | $S_1\ R_7$ |
| $K_{init}+1$ | $K_{init}+1$ | $K_{init}+2$ | $K_{init}+2$ |

*Figure 11*

MESSAGE INSERTION AND EXTRACTION IN DIGITAL DATA

BACKGROUND OF THE INVENTION

1. Field of the Invention

The present invention relates to a method of inserting supplementary information such as a secret mark into a digital signal.

It also relates to a method of extracting a secret mark inserted into a digital signal.

Correspondingly, the present invention relates to a device for inserting supplementary information and a device for extracting supplementary information, both suitable respectively for implementing the insertion and extraction methods according to the invention.

The digital signal considered in what follows will more particularly be a digital image signal.

The insertion and extraction methods in accordance with the invention fall within the technical field of marking (known as watermarking) of the digital data which can be interpreted as the insertion of a seal into the digital data, making it possible, for example, to authenticate the content of a digital data file. This marking is also called digital tattooing.

2. Related Art

Marking methods are known, for example from the document by F. Hartung and B. Girod, University of Erlangen-Nuremberg, "Watermarking of uncompressed and compressed video", Signal Processing 66 (1998), pp 283-301, or else from the document U.S. Pat. No. 5,915,027.

However, none of these documents mentions the possibility of inserting a message the size of which is unknown when this message is extracted.

SUMMARY OF THE INVENTION

The present invention aims to remedy the drawbacks of the prior art, by supplying a method and a device for inserting a message into digital data which make it possible to insert a message the size of which is unknown during the subsequent extraction of this message.

To this end, the invention proposes a method of inserting a message into digital data representative of physical quantities, the message including ordered symbols, including the steps of:
  segmenting the data into regions,
  associating at least one region with each symbol to be inserted, characterised in that, for each region into which a symbol in question is to be inserted, it includes the steps of:
  determining a pseudo-random function, from a key which depends:
    on an initial key, and
    on the length of the message,
  modulating the symbol in question by the previously determined pseudo-random function in order to supply a pseudo-random sequence,
  adding the pseudo-random sequence to the region in question.

Correlatively, the invention proposes a device for inserting a message into digital data representative of physical quantities, the message including ordered symbols, including:
  means for segmenting the data into regions,
  means for associating at least one region with each symbol to be inserted,
  characterised in that, it includes:
  means for determining a pseudo-random function, for each region into which a symbol in question is to be inserted, from a key which depends:
    on an initial key, and
    on the length of the message,
  means for modulating the symbol in question by the previously determined pseudo-random function in order to supply a pseudo-random sequence,
  means for adding the pseudo-random sequence to the region in question.

The method and the device according to the invention make it possible to insert an item of supplementary information, or a message, the length of which, expressed in numbers of symbols, is not known during subsequent extraction.

Moreover, the method and the device according to the invention make it possible to insert an item of supplementary information the length of which is arbitrary, while remaining less than the number of regions formed.

According to one preferred characteristic, the dependence of the key as regards the length of the message is provided by the dependence of the key as regards:
  the number of times the symbol to be inserted has already been inserted into other regions, and
  the ranking of the symbol among the ordered symbols.

Hence, the implementation of the invention remains simple and does not require complex calculations.

According to one preferred characteristic, the method includes a prior step of transformation of the digital data by a reversible transformation.

In fact, the invention applies just as well to "original" data, such as an image, as to transformed data.

The invention also relates to a method for extracting a message from digital data representative of physical quantities, the message including ordered symbols, including the steps of:
  segmenting the data into regions,
  extracting the length of the inserted message,
  extracting the inserted message.

The extraction method makes it possible to recover the message which was inserted according to the invention.

According to one preferred characteristic, extracting the length of the inserted message includes the steps of:
  selecting a set of length values, and
  calculating a correlation between the message and the digital data, for each of these values,
  determining a local maximum among the correlation values.

The length of the message is extracted in a reliable way.

According to another preferred characteristic, extracting the length of the inserted message is carried out while processing F times fewer coefficients than the digital data include. The calculations are thus speeded up.

In this case, the method includes the steps of:
  determining the total number of coefficients to be considered,
  selecting a maximum number of coefficients corresponding to the same inserted symbol, then, if the total number of coefficients to be considered has not been reached,
  reiterating the selection step, for another symbol.

The correlation is then more efficient, since it is carried out over a reduced number of symbols. Detection is thus enhanced.

The invention relates to an extraction device implementing the preceding characteristics. The extraction device and method exhibit advantages similar to those which were presented above.

The invention also relates to a digital apparatus including the insertion or extraction device, or means for implementing the insertion or extraction method. This digital apparatus is, for example, digital photographic apparatus, a digital video camera, a scanner, a printer, a photocopier or a fax machine. The advantages of the device and of the digital apparatus are identical to those set out above.

An information storage means, which can be read by a computer or by a microprocessor, integrated into the device or otherwise, possibly removable, stores in memory a program implementing the insertion or extraction method.

BRIEF DESCRIPTION OF THE DRAWINGS

The characteristics and advantages of the present invention will emerge more clearly on reading a preferred embodiment illustrated by the attached drawings, in which.

DETAILED DESCRIPTION OF THE PREFERRED EMBODIMENTS

Figure 1:
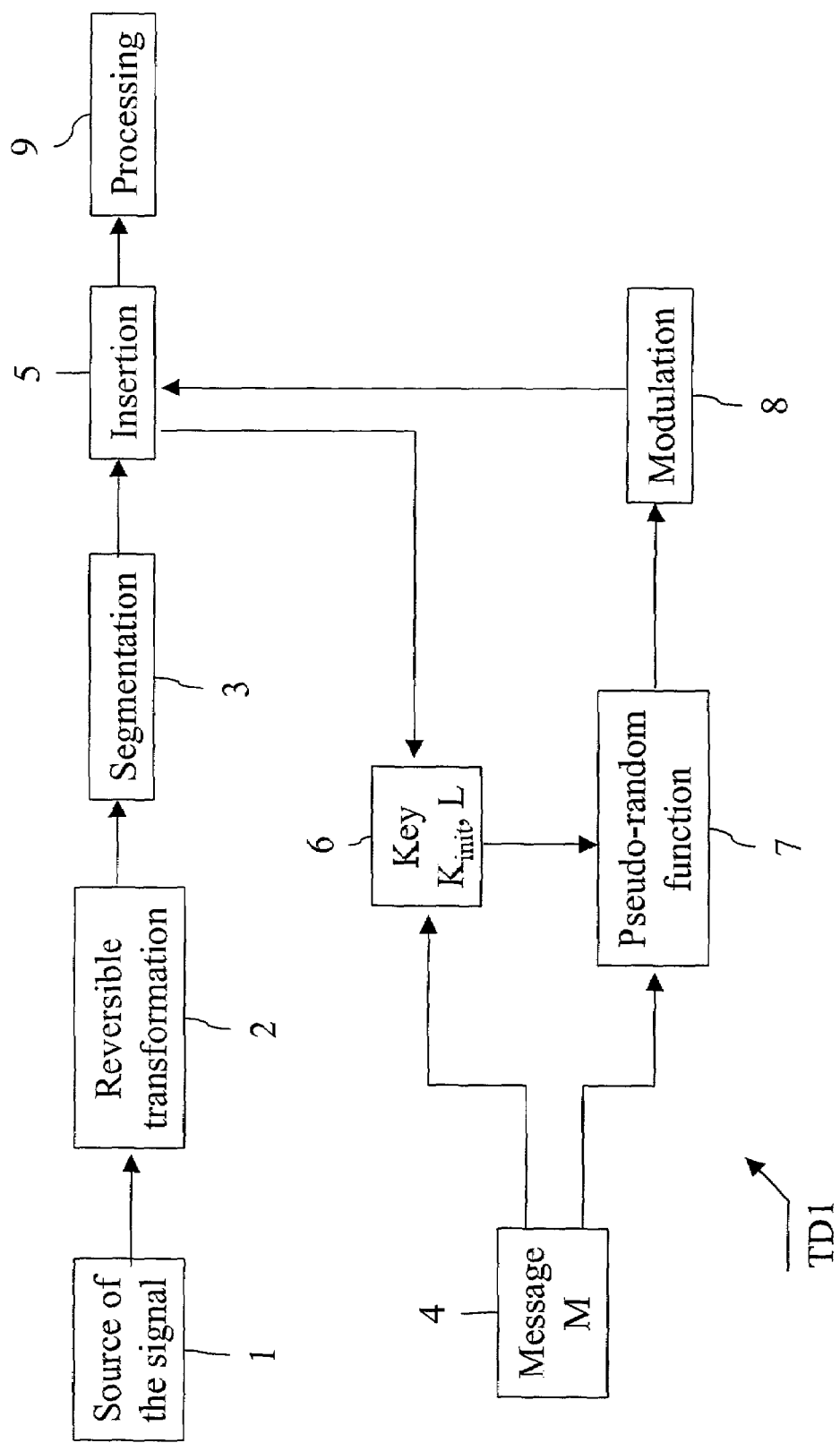
FIG. 1 represents a device for inserting a message into digital data according to the invention.

An embodiment of a device for inserting supplementary information into digital data will firstly be described by reference to FIG. 1. This device is incorporated into a data-processing device TD1, such as a computer, digital photographic apparatus or a scanner, for example.

A source 1 of non-coded data includes, for example, a memory means, such as a random-access memory, hard disk, diskettes or compact disc for storing non-coded data, this memory means being associated with an appropriate reading means for reading the data therein. A means for recording the data in the memory means may also be provided. The source 1 may or may not also be incorporated into the digital apparatus.

In what follows, it will be considered that the data to be coded are a series of digital samples representing a digital image IM. An original image IM may be represented by a series of pixels coded over 8 bits, or a byte, for example. The black and white image IM may thus be broken down in the space domain into a set of coefficients over 256 grey levels, each coefficient value representing one pixel of the image IM.

The signal source 1 is linked to a reversible-transformation circuit 2. This transformation is, for example, a wavelet transformation of the image or else a discrete-cosine transformation, called DCT, in blocks. Transformation implements a decomposition of the digital image, and supplies a set of coefficients. If this transformation is a wavelet transformation, these coefficients carry spatio-temporal information. If this transformation is a DCT transformation by blocks, the coefficients are spectral coefficients. This transformation is not essential for the invention which can be implemented on the spatial coefficients of an image.

The circuit 2 is linked to a segmentation circuit 3 which segments the image into blocks, or regions, of predetermined size.

A message M to be inserted is stored in a memory 4. Each symbol of the message M is inserted into at least one block formed in the image, by an insertion circuit 5.

In order to insert a symbol, a key generator 6 generates a key as a function of an initial key $K_{init}$ and of the length L of the message to be inserted. The key generated is forwarded to a pseudo-random generator 7 which generates a pseudo-random sequence.

The pseudo-random sequence is forwarded to a modulation circuit 8 which also receives the current symbol to be inserted. The circuit 8 modulates the symbol with the pseudo-random sequence, which produces a second pseudo-random sequence. This sequence is modified in amplitude so as to ensure the invisibility of the inserted message, then is supplied to the insertion circuit 5, which receives the blocks formed by the segmentation circuit 3.

The amplitude modification of each coefficient of the pseudo-random sequence depends on a psycho-visual model. The psycho-visual model depends on the transformation mode used.

For example, the psycho-visual model is spatial and attributes a maximum modification to each pixel of the image. Each pixel of the image is thus weighted in such a way as to reach this maximum amplitude. The maximum modification attributed to each pixel increases as a function of the degree of activity in the vicinity of the pixel in question. The degree of activity is a measure of the texture. Hence, a pixel situated in a highly textured area of the image will be modified more than a pixel situated in a uniform area.

The circuit 5 adds the pseudo-random sequence supplied by the circuit 8 to the current block, as a function of the association between each symbol to be inserted and at least one block. The circuit 5 supplies a marked block.

Coded-data user means 9 are linked at the output of the insertion circuit 5.

The user means 9 include, for example, means for memory storage of coded data, and/or means for sending coded data.

Figure 2:
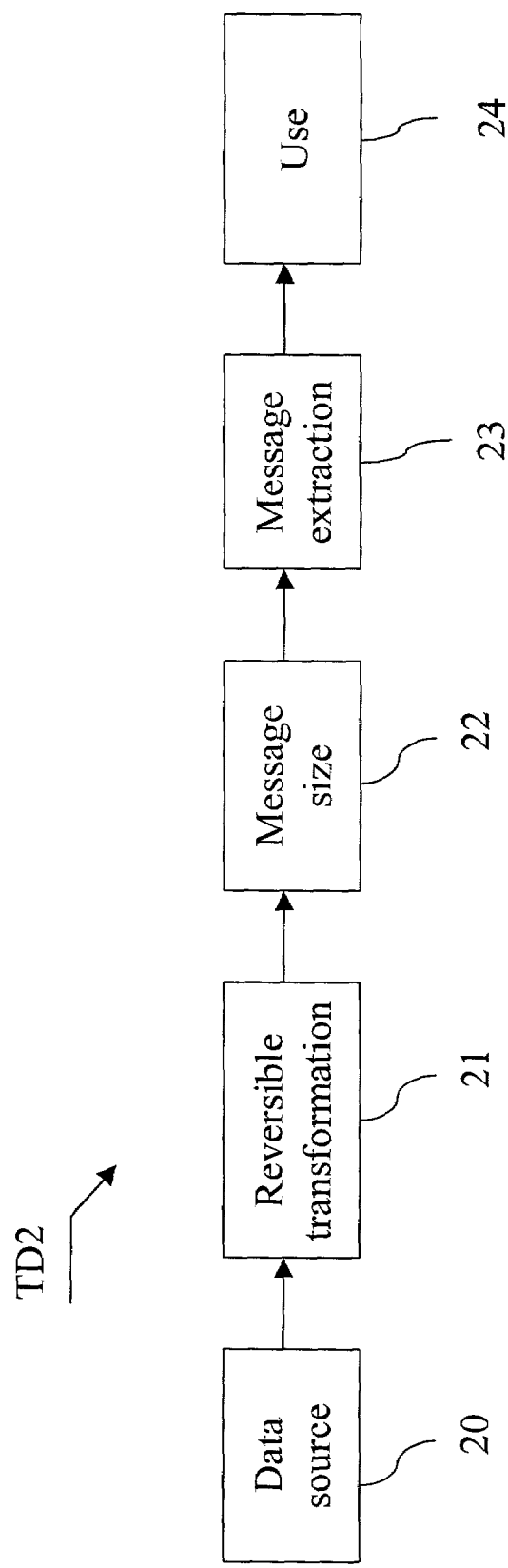
FIG. 2 represents a device for detecting a message inserted into digital data according to the invention.

A device for detecting supplementary information, corresponding to the preceding insertion device, is represented in FIG. 2. This device for detecting supplementary information in data is integrated into a data-processing device TD2, such as a computer, digital photographic apparatus or a fax machine, for example.

The detection device includes a source of data 20 into which data a message has been inserted.

An output from the source 20 is linked to a reversible-transformation circuit 21, identical to the circuit 2 of the previously described device TD1.

An output of the circuit 21 is linked to a circuit 22 for detecting the size of the inserted message. The operation of this circuit will be described in what follows.

An output of the circuit 22 is linked to a circuit 23 for extracting the inserted message. The operation of this circuit will be described in what follows.

The detected message is then supplied to a use circuit 24, which includes a screen, for example, making it possible to read the message.

The operation of the detection device will be detailed in what follows.

Figure 3:
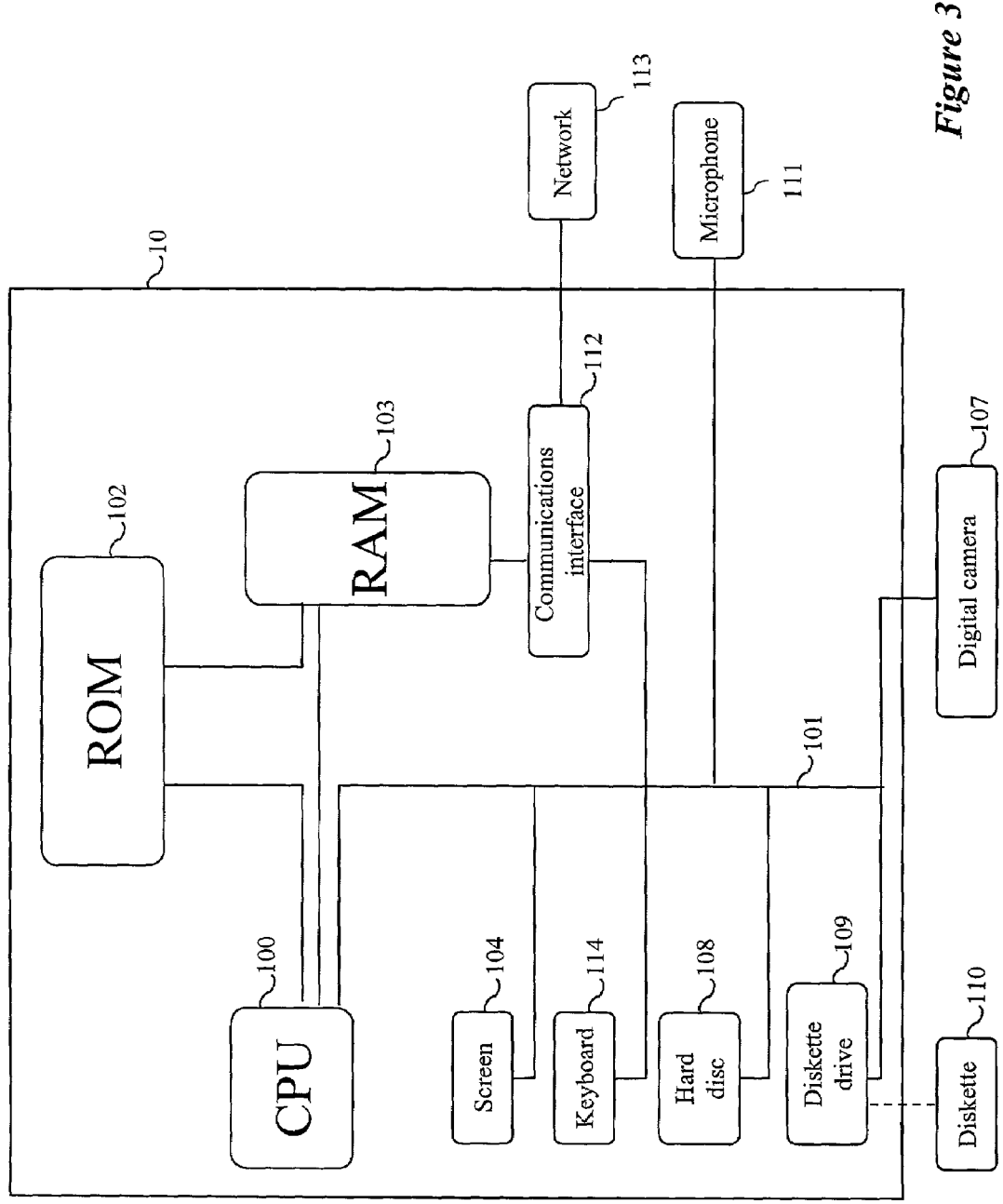
FIG. 3 represents a device implementing the invention.

As represented in FIG. 3, a device implementing the invention is, for example, a microcomputer 10 connected to various peripherals, for example a digital camera 107 (or a scanner, or any image acquisition or storage means) connected to a graphics card and supplying information to be processed according to the invention.

The device 10 includes a communications interface 112 linked to a network 113 able to transmit digital data to be processed, or conversely to transmit data processed by the device. The device 10 also includes a storage means 108 such as a hard disk, for example. It also includes a disk 110 drive 109. This disk 110 may be a diskette, a CD-ROM or a DVD-ROM, for example. The disk 110, like the disk 108, may contain data processed according to the invention as well as the program or programs implementing the invention which, once read by the device 10, will be stored on the hard disk 108. According to one variant, the program allowing the device to implement the invention could be stored in read-only memory 102 (called ROM on the drawing). In a second variant, the program could be received so as to be stored in a way identical to that described above by means of the communications network 113.

The device 10 is linked to a microphone 111. The data to be processed according to the invention will be audio signal, in this case.

This same device possesses a screen 104 making it possible to view the data to be processed or to serve as interface with the user who can thus set parameters for certain processing modes, by the use of the keyboard 114 or of any other means (mouse, for example).

The central processing unit 100 (called CPU on the drawing) executes the instructions relating to the implementing of the invention, instructions stored in the read-only memory 102 or in the other storage elements. On powering up, the processing programs stored in a non-volatile memory, for example the ROM 102, are transferred into the random-access memory RAM 103 which will then contain the executable code of the invention as well as registers for storing the variables necessary for implementing the invention.

More generally, an information-storage means, which can be read by a computer or by a microprocessor, incorporated into the device or otherwise, possibly removable, stores a program implementing the method according to the invention.

The communications bus 101 allows communication between the various elements included in the microcomputer 10 or linked to it. The representation of the bus 101 is not a limitation, and the central processing unit 100 especially is capable of communicating instructions to any element of the microcomputer 10 directly or via another element of the microcomputer 10.

The operation of the marking-insertion and marking-detection devices according to the invention will now be described by means of algorithms.

Figure 4:
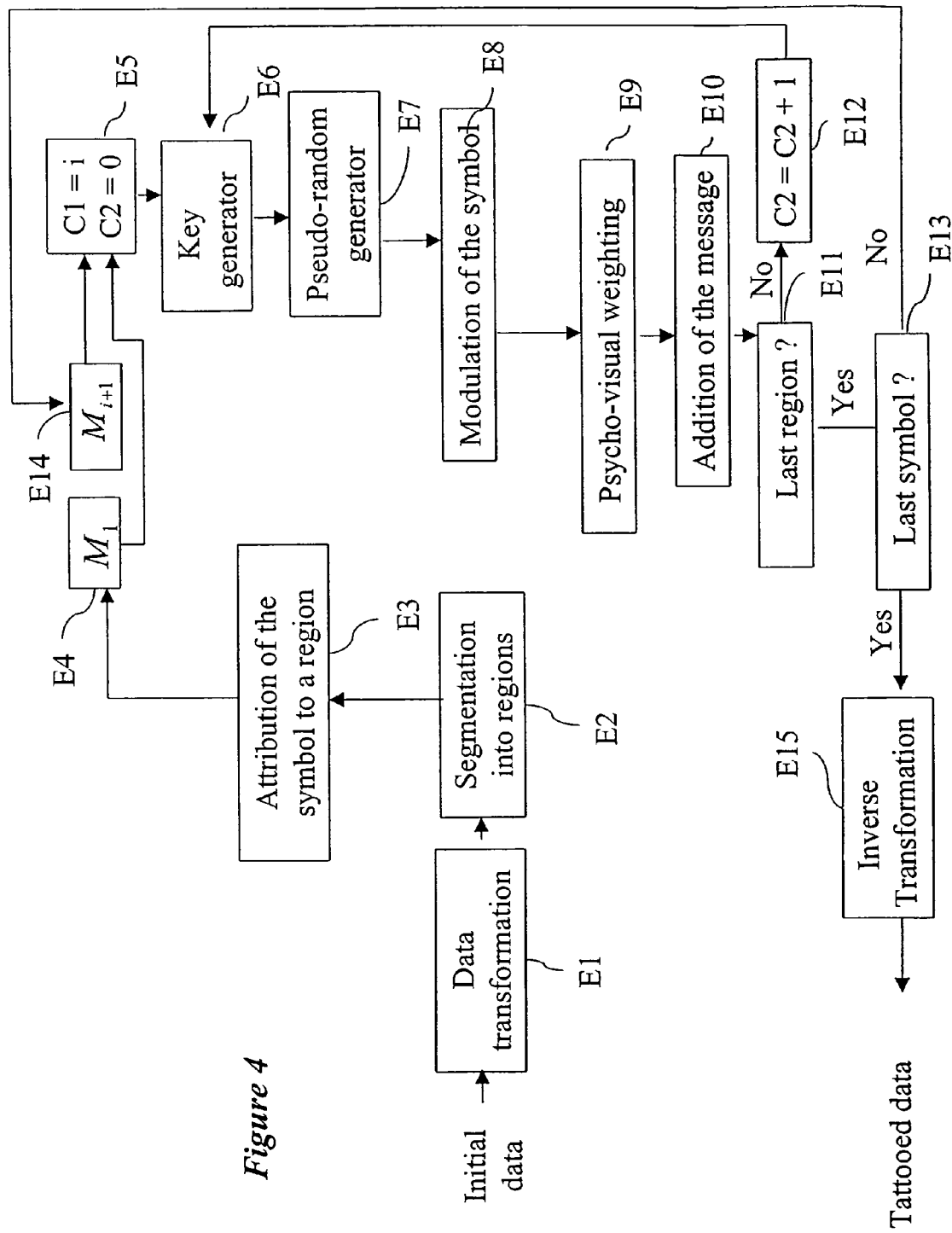
FIG. 4 represents a method of inserting a message into digital data according to the invention.

The algorithm of FIG. 4 represents the overall operation of the insertion device according to the invention and includes steps E1 to E15.

This algorithm can be wholly or partly stored in memory in any information-storage means capable of working with the microprocessor. This storage means can be read by a computer or by a microprocessor. This storage means is or is not integrated into the device, and may be removable. For example, it may include a magnetic tape, a diskette or a CD-ROM (compact disc with fixed memory).

The step E1 is a reversible transformation of the data, for example a wavelet transformation of the image, so as to transform the spatial coefficients into other coefficients the statistical properties of which allow better subsequent extraction of the inserted message. This step is optional.

The following step E2 is the segmentation of the data into regions, for example into adjacent blocks. The number and/or the size of the regions may be predetermined or adjustable by a user.

The message M to be inserted includes L symbols, where L is an integer. Each symbol $M_i$, with the integer i varying from 1 to L, is associated with at least one region at the following step E3. A given region is associated with a single symbol to be inserted. For associating the symbols to the regions, these latter are scanned in a predetermined order.

The following step E4 is an initialisation in order to consider the first symbol $M_1$ to be inserted, as well as the first region into which this symbol is to be inserted.

At the following step E5 a variable C1 representing the ranking of the current symbol is set to the value 1 and a variable C2 is set to the value 0. The variable C2 represents the number of times the current symbol has already been inserted. The variables C1 and C2 are related to the length of the message M.

The following step E6 is the generation of a key K as a function of an initial key $K_{init}$ and of the variables C1 and C2. Two examples are detailed in what follows.

The following step E7 is the generation of a pseudo-random sequence as a function of the previously generated key K.

The following step E8 is the modulation of the symbol $M_i$ by the previously generated pseudo-random sequence, which results in a second pseudo-random sequence.

The following step E9 is a psycho-visual weighting of the second pseudo-random sequence in order to ensure that it is invisible in the image.

The pseudo-random sequence thus modified is then added to the current region at the following step E10.

The following step E11 is a test in order to determine whether the current region is the last one for the current symbol. If the response is negative, that means that there remains at least one region into which the current symbol is to be inserted. The step E11 is then followed by the step E12. At step E12, the following region into which the symbol $M_i$ is to be inserted is considered, and the variable C2 is incremented by one unit.

The step E12 is followed by the previously described step E6.

When the response is positive at step E11, that means that the current symbol has been inserted into all the regions which are associated with it.

The step E11 is then followed by step E13 which is a test to determine whether the current symbol is the last symbol to be inserted. If the response is negative, that means that at least one symbol remains to be inserted, and this step is followed by step E14 at which the parameter i is incremented by one unit in order to consider the following symbol $M_{i+1}$ and the first region which is associated with it.

Step E14 is followed by the previously described step E5.

When the response is positive at step E13, that means that all the symbols have been inserted into the image. Step E13 is then followed by step E15 at which an inverse transformation is carried out on the processed data. The inverse transformation corresponds to the transformation of the step E1 and is for the purpose of supplying the spatial coefficients of an image into which the message M has been inserted. Obviously, if the transformation of the step E1 has not been carried out, neither is the inverse transformation of step E15.

Figure 5:
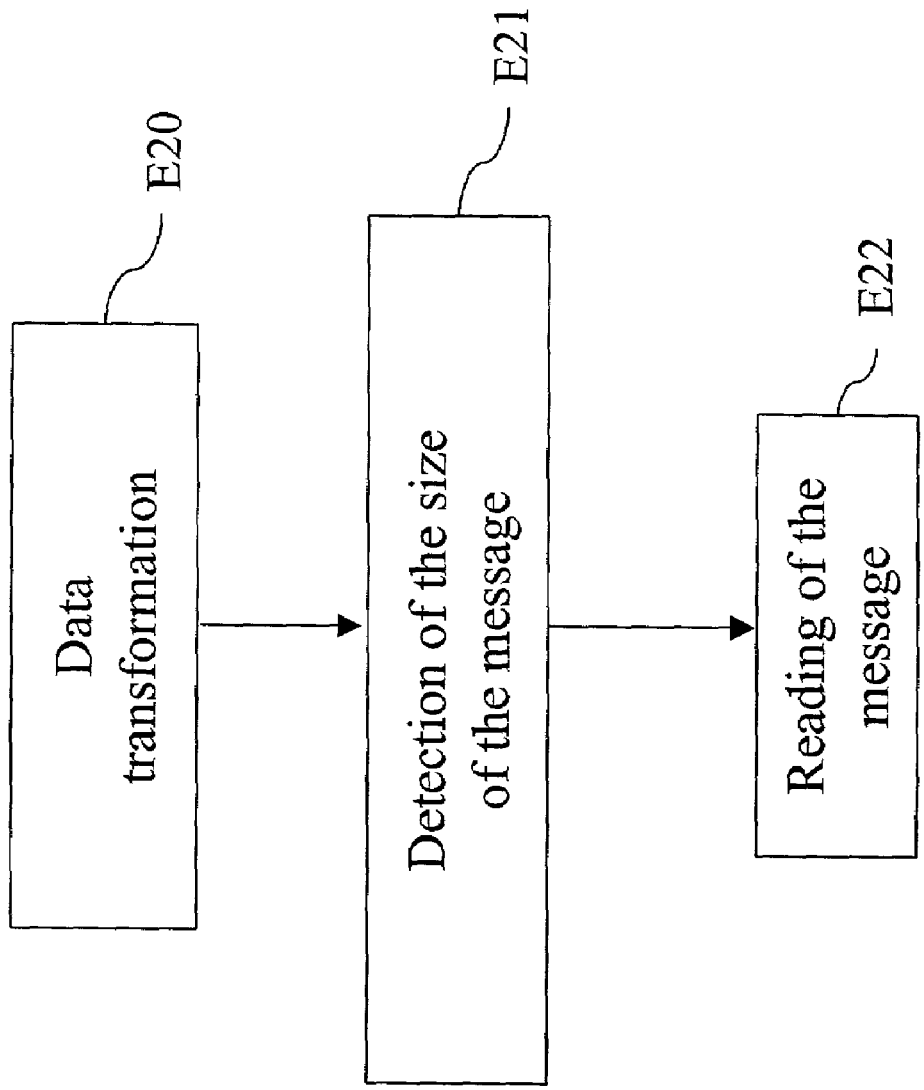
FIG. 5 represents a method for detecting a message inserted into digital data according to the invention.

The algorithm of FIG. 5 represents the overall operation of the extraction device according to the invention and includes steps E20 to E22.

This algorithm can be stored in memory wholly or partly in any information-storage means capable of working with the microprocessor. This storage means can be read by a computer or by a microprocessor. This storage means is or is not integrated into the device, and may be removable. For example, it may include a magnetic tape, a diskette or a CD-ROM (compact disc with fixed memory).

Step E20 is a reversible transformation of the data into which a message has been inserted, in order to transform the spatial coefficients. This step is carried out only if insertion was previously carried out into transformed data. The transformation here is identical to that used during insertion of the message.

The following step E21 is the detection of the size of the inserted message. This step will be detailed in what follows.

The following step E22 is the extraction of the message proper. This step is detailed in what follows.

Figure 6A:
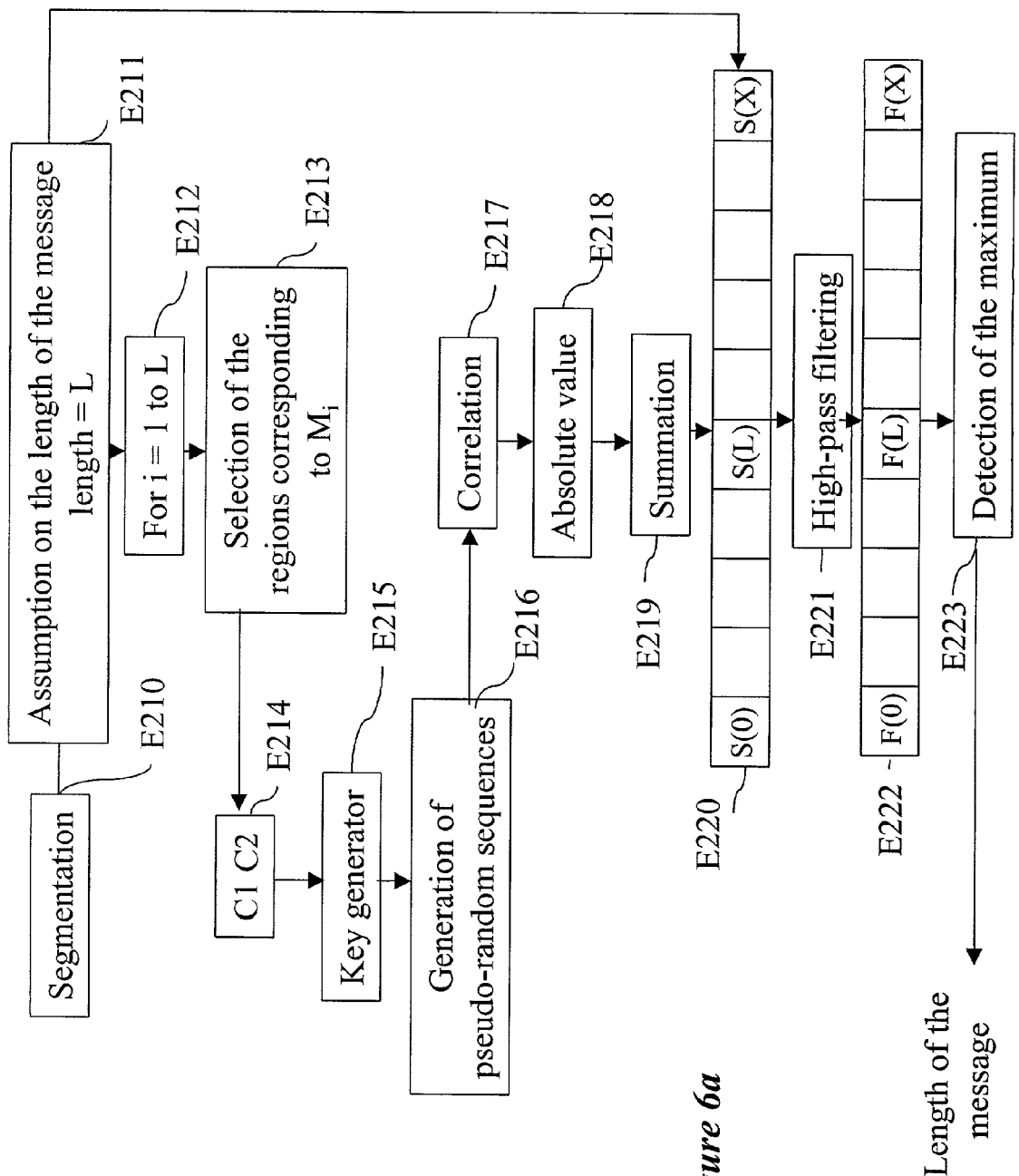
FIGS. 6a, 6b, 7a and 7b represent different modes of implementing the method of detecting the size of a message inserted into digital data, included in the method of FIG. 5.

A first implementation for detecting the size of the inserted message is now detailed by reference to FIG. 6a, and includes steps E210 to E223.

In this implementation, the inserted message consists of symbols which are bits.

Step E210 is a segmentation of the data into which the message has previously been inserted. This step is identical to step E2 (insertion).

The following step E211 is an assumption as to the value of the length L of the message which it is sought to extract. The length L may take values between one and a maximum value $L_{max}$, which is fixed a priori or which depends on the size of the image. All these values will be considered successively.

The following step E212 makes it possible to carry out looping around all the symbols $M_1$ to $M_L$ of the message. For each loop, a current symbol $M_i$ is considered.

The following step E213 is the selection of the regions corresponding to the current symbol $M_i$. The mechanism for attributing a region to a symbol is identical to that used at step E3 (insertion).

The following step E214 is the determination of the variables C1 and C2 for the current symbol and for each of the regions selected at the preceding step. As before, the variable C1 represents the ranking of the current symbol, and thus has a unique value for all the regions selected. The variable C2, for each region, represents the number of times the current symbol has already been inserted.

The following step E215 is a generation of keys, for the current symbol and for each region selected at step E213. The key generation is identical to that at step E6 (insertion), and especially uses the initial key $K_{init}$.

The following step E216 is the generation of pseudo-random sequences as a function of each of the previously generated keys K.

The following step E217 is the calculation of the correlation between the pseudo-random sequences generated at the preceding step and the regions selected at step E213.

The following step E218 calculates the absolute value of the correlation calculated for the current bit and for all the regions which are associated with it.

If the assumption (step E211) as to the size of the message is false, then the value calculated at step E218 remains low. In contrast, if the assumption of the size of the message is true, then the value calculated at step E218 is high.

The following step E219 is the summing of the absolute value of the correlation calculated for the current symbol with the absolute values of the correlation previously calculated for the other symbols, for the message length in question.

For a given message length, the steps E212 to E219 are repeated for all the symbols of the message.

Steps E211 to E219 are repeated for all the message lengths to be considered.

Each sum calculated at step E219 (that is to say for each message length to be tested) is stored in memory in a table at the following step E220. When all the message lengths have been processed, the table is completely filled and the local maximum has to be determined from among the values of this table.

To do that, high-pass filtering is carried out on the table at step E221. For example, the high-pass filtering calculates the discrepancy between the value of the current "cell" of the table and the average of its neighbours. The corresponding high-pass filter is the (−0.5, 1, −0.5) filter.

The result of the filtering is written into a second table at step E222.

The following step E223 is the detection of the maximum value contained in the second table. This maximum value corresponds to a length, which is the size of the inserted message. The technique which is used here is the local-maximum detection, which makes it possible to extract the size of the short-length messages efficiently when the range of possible message sizes is very wide, for example from one up to several thousand bits.

Figure 6B:
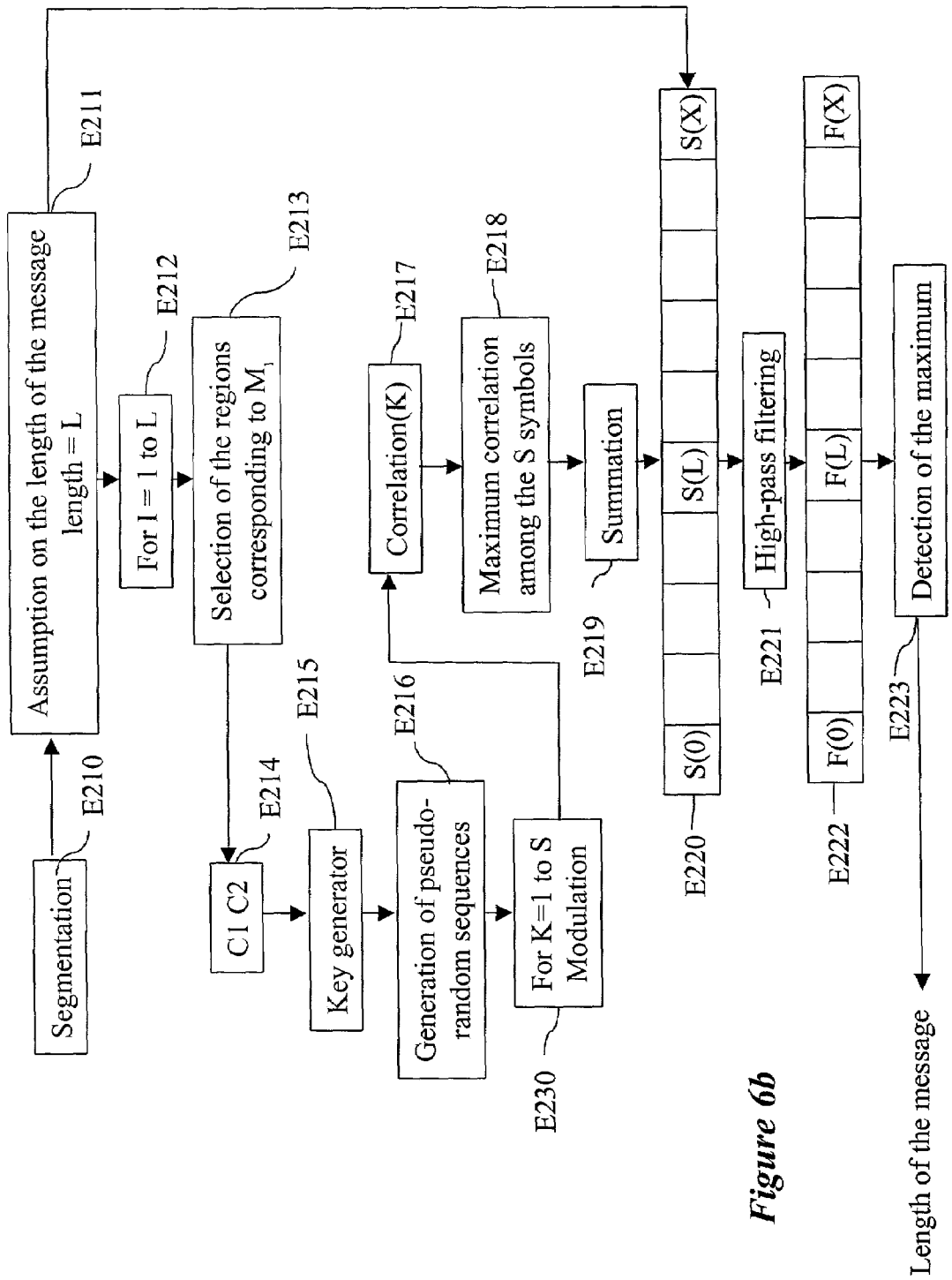

A second implementation of detection of the size of the inserted message is now detailed by reference to FIG. 6b, and includes steps E210 to E223 and E230. Steps E210 to E223 are similar to those described previously (FIG. 6a).

In this implementation, the inserted message consists of symbols which are not bits, but belong to a dictionary of S signs, with S an integer greater than two.

Step E230 is added between steps E216 and E217 and the steps E217 and E218 are modified. For the set of regions corresponding to a same unknown symbol, it has to be determined which is the most probable symbol. To do that, the pseudo-random sequences generated at step E216 modulate each of the S possible symbols at step E230.

The correlation between the resulting S sequences and the selected regions is then calculated at step E217.

At step E218, the maximum value from among the S correlation values is kept. This value is added to the other correlation values corresponding to the other symbols at step E219.

Figure 7A:
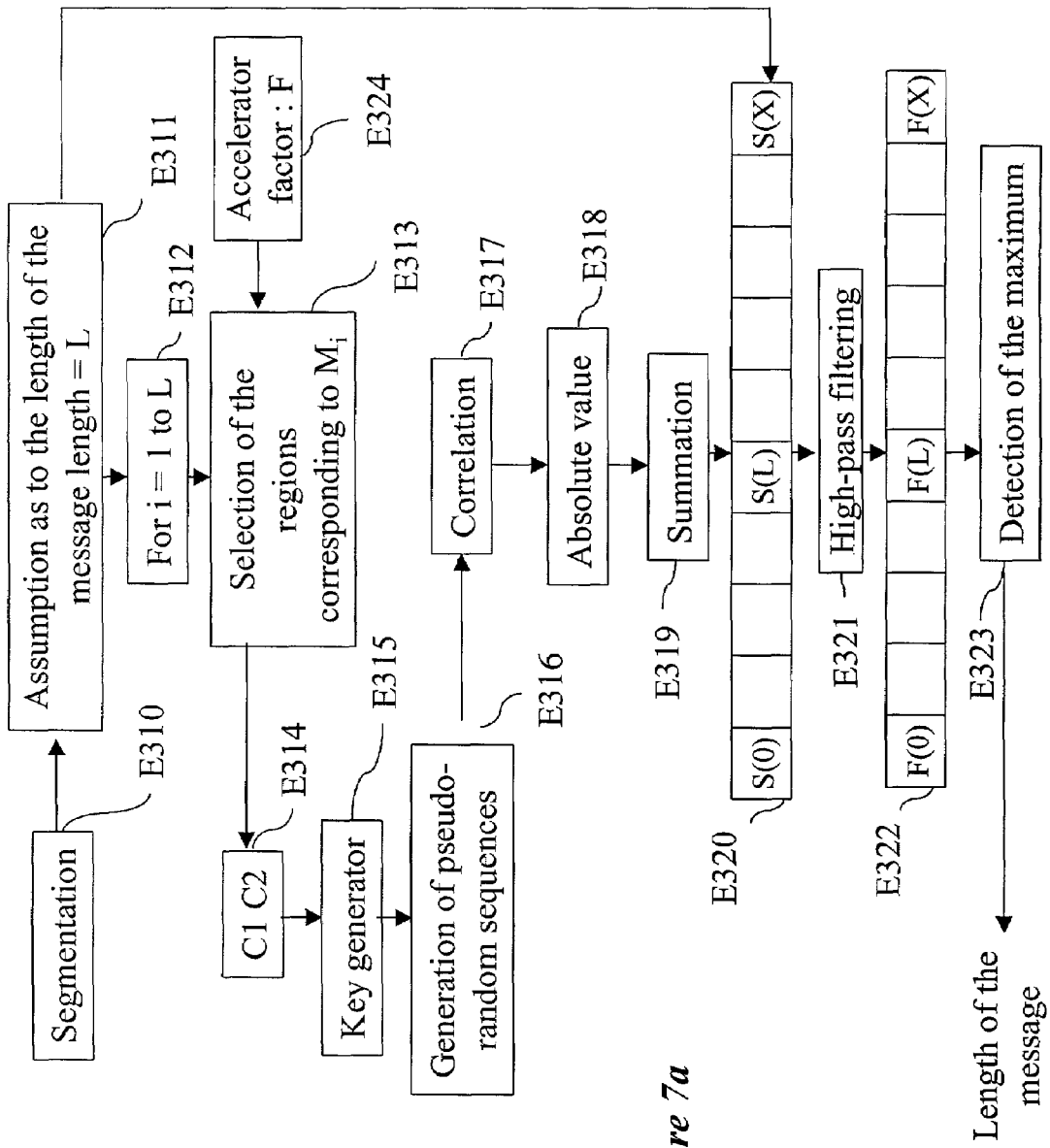

FIG. 7a represents a first variant implementation of detection of the size of the inserted message, in the case in which the message is composed of bits. This implementation is represented in the form of an algorithm which includes steps E310 to E324.

Steps E310 to E323 are similar respectively to steps E210 to E223.

The supplementary step E324 makes it possible to speed up the calculations during extraction of the length of the message. An acceleration factor F makes it possible to select F times fewer pixels at step E313 than when the factor is equal to one.

As a consequence, the pseudo-random sequence generation step E316 generates F times fewer values. The correlation step E317 processes F times fewer values. It should be noted, however, that the pixels are selected in a specific way, which will be detailed by reference to FIG. 8, so that the phase of detecting the length of the message is optimal.

Figure 7B:
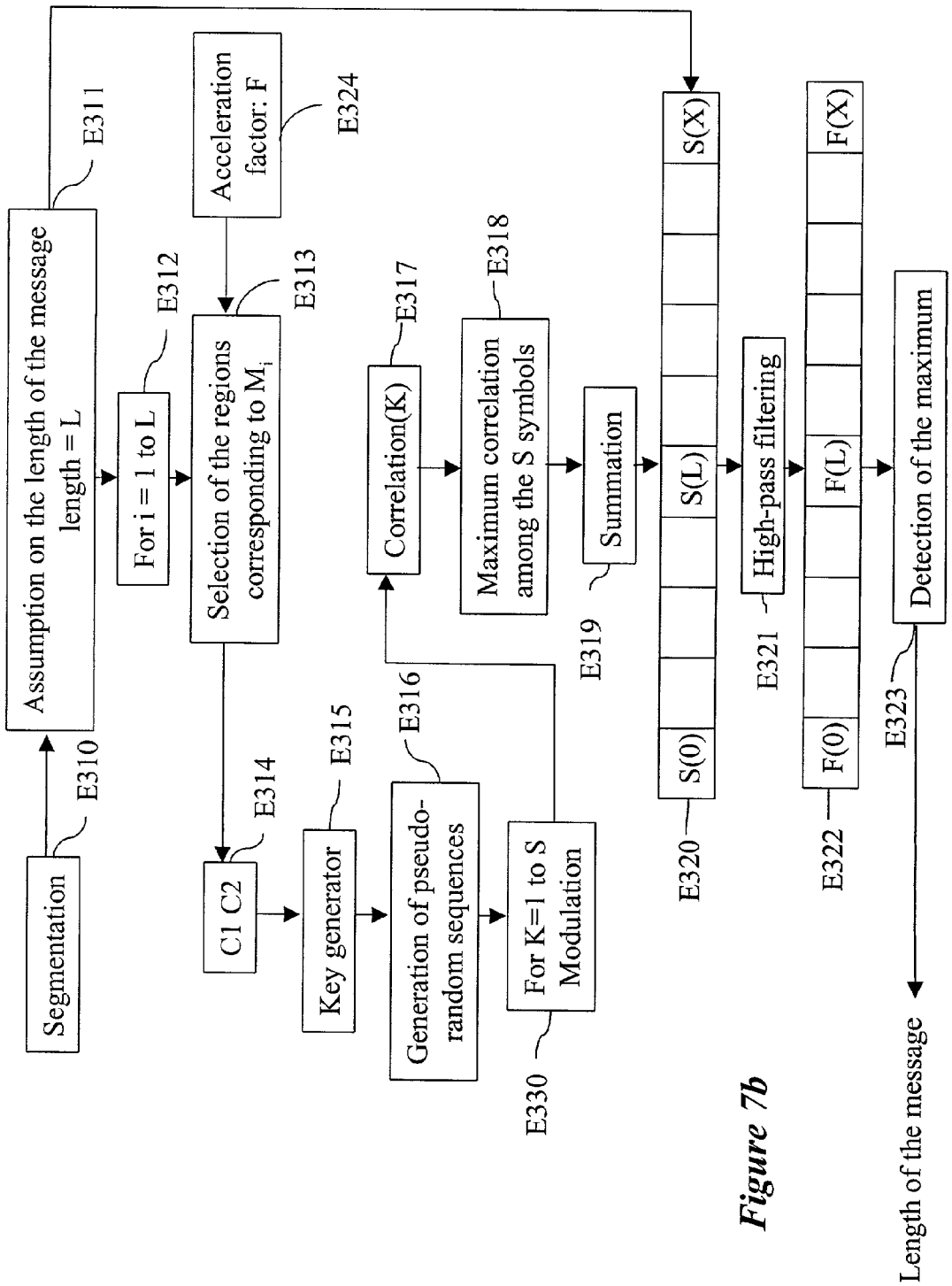

FIG. 7b represents a second variant implementation of detection of the size of the inserted message, in the case in which the message is composed of symbols which are not bits. This implementation is represented in the form of an algorithm which includes steps E310 to E330.

Steps E310 to E324 are respectively similar to the steps previously described.

Step E330 is added between steps E316 and E317 and the steps E317 and E318 are modified. For the set of regions corresponding to a same unknown symbol, it has to be determined which is the most probable symbol. To do that, the pseudo-random sequences generated at step E316 modulate each of the S possible symbols at step E330.

The correlation between the resulting S sequences and the selected regions is then calculated at step E317.

At step E318 the maximum value from among the S correlation values is kept. This value is added to the other correlation values corresponding to the other symbols at step E319.

Figure 8:
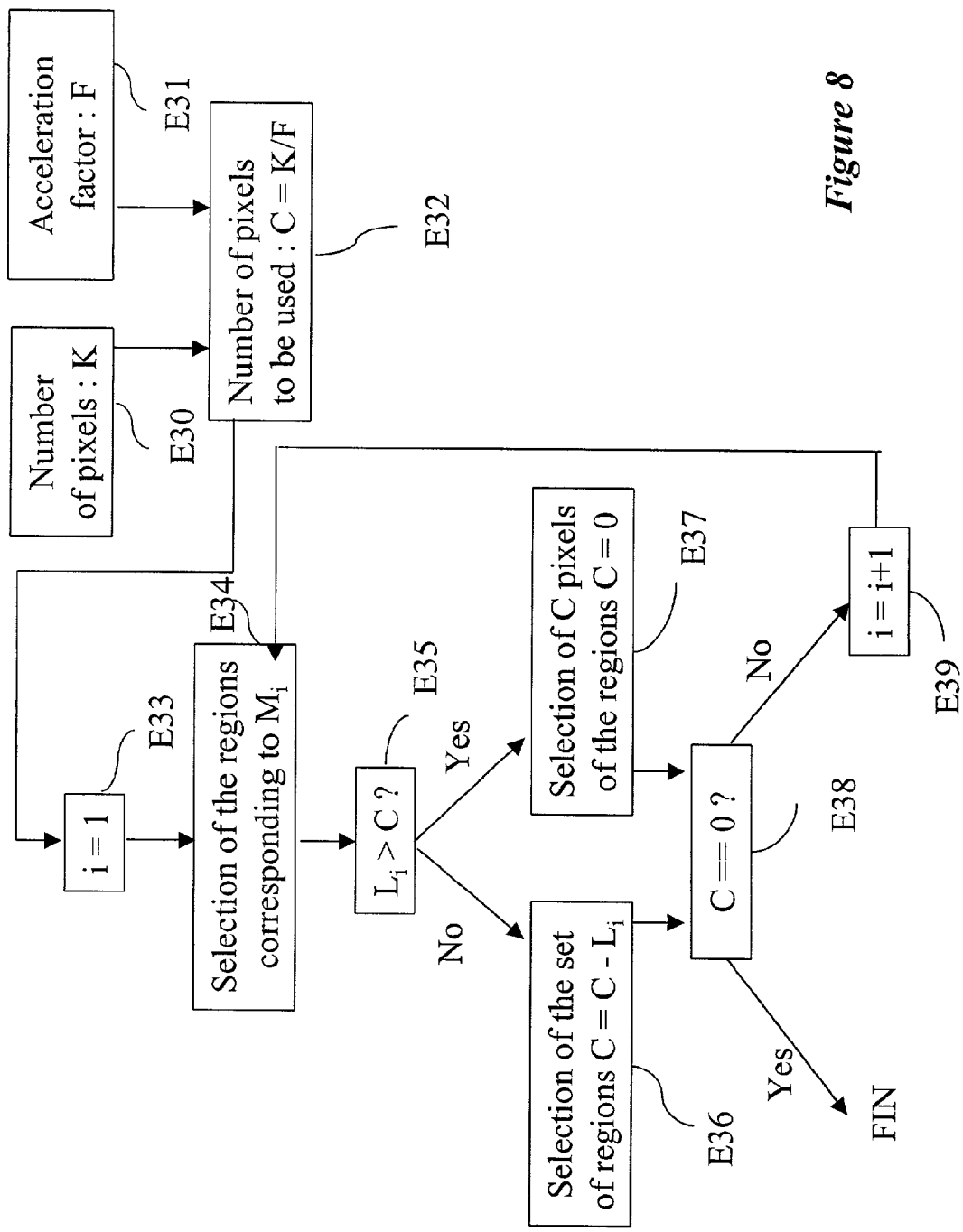
FIG. 8 represents a method of speeding up calculations, included in the method of FIG. 7.

FIG. 8 illustrates the acceleration of the calculations, in the form of an algorithm including steps E30 to E39.

The principle of the acceleration is to choose a number of coefficients in the data into which a message has been inserted, then to consider the maximum number of coefficients relating to the minimum number of symbols sought. In other words, those coefficients are chosen corresponding to the same inserted symbol, as far as possible, then the symbols are looped round, as long as the number of coefficients chosen at the outset has not been reached.

Hence, the correlation which is carried out subsequently is more efficient and the detection of the symbols is enhanced.

From the data into which a message has been inserted, the number K of coefficients, here of pixels, of these data is determined at step E30.

The acceleration factor F is determined at step E31, for example by reading it from a predetermined memory area, and the number C of pixels to be used is determined at step E32 by the formula: C=Int[K/F], where Int[. . . ] denotes the integer part. The number C will then be decremented every time pixels are selected.

From the segmented data (E310) a loop is performed for each symbol of the message of length L.

This loop commences at step E33 which is an initialisation in order to consider the first symbol $M_1$.

The following step E34 is the selection of the regions corresponding to the current symbol $M_i$. The set of these regions includes $L_i$ coefficients.

The following step E35 is a test for comparing the size $L_i$ and the number C of pixels to be used.

If the size $L_i$ is less than the number C, then this step is followed by step E36 at which all the pixels of the regions in question are selected and the number C is then equal to $C-L_i$.

If the size $L_i$ is greater than the number C, then this step is followed by step E37 at which the first C pixels are selected from the regions in question and the number C is set to the value zero.

Steps E36 and E37 are followed by step E38 which is a test in order to determine whether the number C is zero. If the response is positive, then the selection of the pixels is terminated. If the response is negative, then step E38 is followed by step E39 in order to consider a following symbol in the message. Step E39 is followed by the previously described step E34.

Figure 9A:
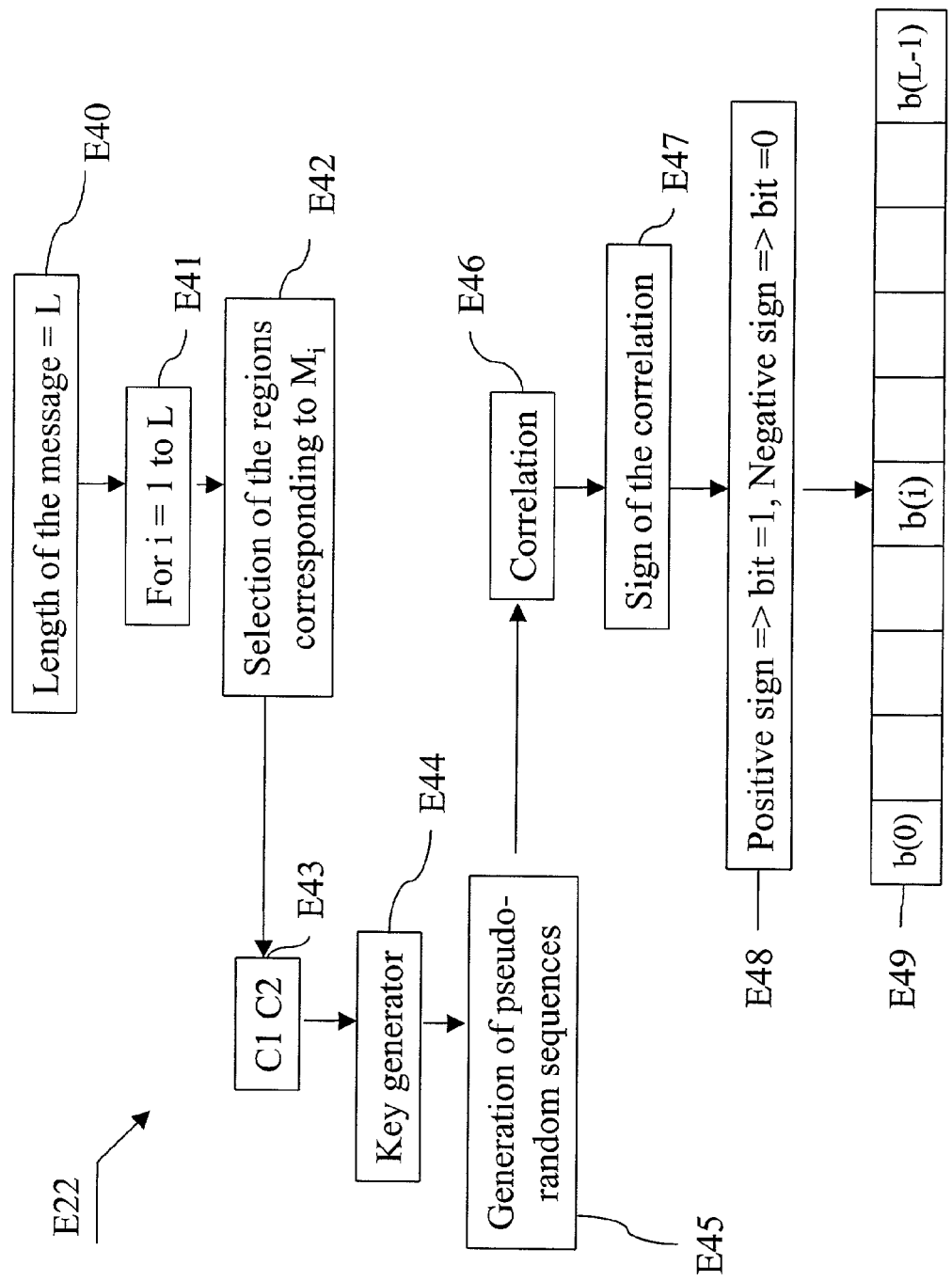
FIG. 9a represents a first implementation of a message-determination method, included in the method of FIG. 5.

FIG. 9a illustrates a first implementation of extraction of the message proper (step E22), in the algorithm of FIG. 5. This implementation corresponds to the case in which the symbols of the message are bits.

The extraction is represented in the form of an algorithm including steps E40 to E49.

Step E40 is a reading in memory of the length L of the inserted message. This length has been determined previously (step E21).

The following step E41 is an initialisation of a loop in order to consider all the symbols of the message successively.

For each symbol, step E42 is a selection of the regions corresponding to the current symbol $M_i$.

The following step E43 is the determination of the values of the variables C1 and C2 respectively for each of the previously selected regions. The variables C1 and C2 are determined as set out above.

The following step E44 is the calculation of the key corresponding to each of the pairs of values (C1, C2).

The following step E45 is the calculation of the pseudo-random sequence corresponding to each of the previously calculated keys.

The following step E46 is the calculation, for each previously calculated pseudo-random sequence, of the correlation between the pseudo-random sequence and the region which corresponds to it.

The following step E47 is the addition of all the correlation values corresponding to the current symbol. The sign of the sum is then determined.

The following step E48 is a decision as to the value of the symbol sought. If the previously determined sign is positive, then the symbol is the one bit, and otherwise the symbol is the zero bit.

The value of the bit is then stored in memory at the following step E49.

When all the bits have been determined, the inserted message has been fully defined.

Figure 9B:
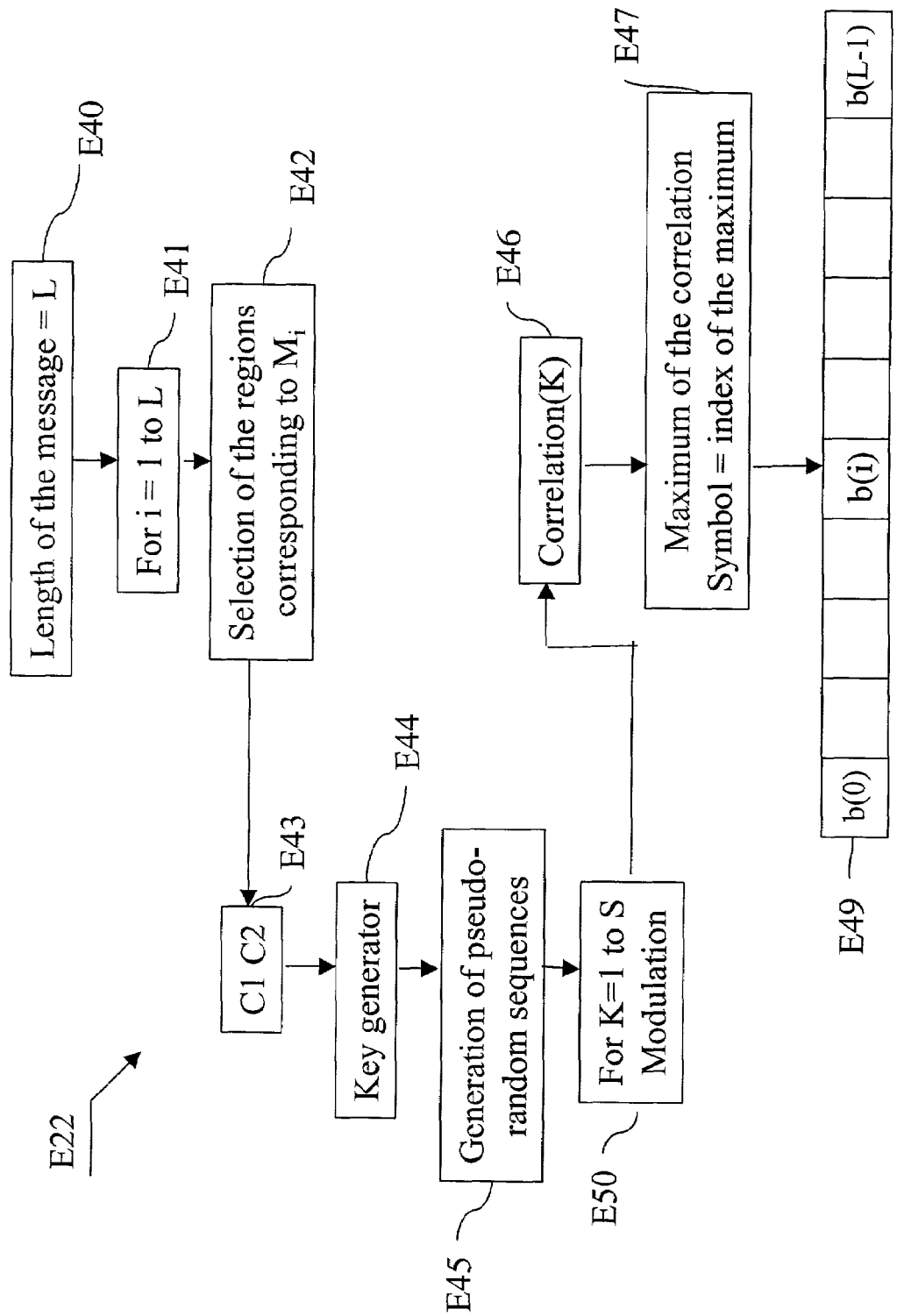
FIG. 9b represents a second embodiment of a message-determination method, included in the method of FIG. 5, FIGS. 10 and 11 represent examples of key attribution according to the invention.

FIG. 9b illustrates a second implementation of extraction of the message proper (step E22), in the algorithm of FIG. 5. This implementation corresponds to the case in which the symbols of the message are not bits but belong to a dictionary of S signs, with S an integer greater than two.

This implementation is represented in the form of an algorithm which includes steps E40 to E50.

Steps E40 to E47 and E49 are similar respectively to the steps bearing the same references and described previously. Step E48 is dispensed with.

Step E50 is added between steps E45 and E46 and the steps E46 and E47 are modified. In order to extract an unknown symbol, the set of regions corresponding to this unknown symbol are considered. It is then necessary to determine which is the most probable symbol from among the S possible symbols. To do that, the pseudo-random sequences generated at step E45 modulate each of the S possible symbols at step E50.

The correlation between the S resulting sequences and the selected regions is then calculated at step E46.

At step E47, the maximum value from among the S correlation values indicates the value of the current symbol. This value is stored in memory at the following step E49.

FIG. 10 is a first example of key attribution according to the invention. These keys serve as germs for generating the pseudo-random sequences. The image has been divided up into eight rectangular regions $R_0$ to $R_7$.

The message to be inserted includes three symbols $S_0$, $S_1$ and $S_2$. One message symbol is attributed to each region.

A key is attributed to each region. This key depends on the index of the symbol buried in the region in question, and on the number of times this symbol has already previously been inserted.

For any region, there is a relationship:

$$K = K_{init} + N \cdot C2 + C1$$

where N is an integer equal to $L_{max}+1$.

It will be recalled that $L_{max}$ is the maximum value which the length of the message can take.

FIG. 11 is the second example of key attribution according to the invention. These keys serve as germs for generating the pseudo-random sequences. The image has been divided up into eight rectangular regions $R_0$ to $R_7$.

The message to be inserted includes three symbols $S_0$, $S_1$ and $S_2$. One message symbol is attributed to each region.

A key is attributed to each region. This key depends on the index of the symbol buried in the region in question, and on the number of times this symbol has already previously been inserted.

For any region, there is a relationship:

$$K = K_{init} + C2$$

Obviously, the present invention is not in any way limited to the implementations described and represented, but, on the contrary, encompasses any variant within the grasp of the person skilled in the art.

The invention claimed is:

1. A method of inserting a message into digital data representative of physical quantities, the message including ordered symbols, said method comprising the steps of:
    segmenting the data into regions; and
    associating at least one region with each symbol to be inserted, wherein, for each region into which a symbol in question is to be inserted, said method includes the steps of:
        determining a pseudo-random function, from a key which depends on an initial key and on a length of the message,
        modulating the symbol in question by the previously determined pseudo-random function in order to supply a pseudo-random sequence, and
        adding the pseudo-random sequence to the region in question,
    wherein the dependence of the key on the length of the message is provided by a dependence of the key on:
        the number of times the symbol to be inserted has already been inserted into other regions, and
        the ranking of the symbol among the ordered symbols.

2. A method according to claim 1, further comprising the step of transforming the digital data by a reversible transformation.

3. A storage medium storing a computer-readable program for implementing a method for inserting according to claim 1.

4. A storage medium according to claim 3, wherein said storage medium is detachably mountable on a device for inserting a message that includes ordered symbols into digital data representative or physical quantities, and wherein the device comprises:
    means for segmenting the data into regions;
    means for associating at least one region with each symbol to be inserted, said device further including:
        means for determining a pseudo-random function, for each region into which a symbol in question is to be inserted, from a key which depends on an initial key and on a length of the message,
        means for modulating the symbol in question by the previously determined pseudo-random function in order to supply a pseudo-random sequence, and
        means for adding the pseudo-random sequence to the region in question,
    wherein said means for determining a pseudo-random function is configured in such a way that a dependence of the key on the length of the message is provided by a dependence of the key on:
        the number of times the symbol to be inserted has already been inserted into other regions, and
        the ranking of the symbol among the ordered symbols.

5. A storage medium according to claim 3, wherein said storage medium is a floppy disk or a CD-ROM.

6. A programmed computer for inserting a message into digital data representative of physical quantities, the message including ordered symbols, the programmed computer comprising:
    a microprocessor storing:
    means for segmenting the data into regions;
    means for associating at least one region with each symbol to be inserted,
    means for determining a pseudo-random function, for each region into which a symbol in question is to be inserted, from a key which depends on an initial key and on a length of the message,
    means for modulating the symbol in question by the previously determined pseudo-random function in order to supply a pseudo-random sequence, and
    means for adding the pseudo-random sequence to the region in question,
    wherein said means for determining a pseudo-random function is configured in such a way that a dependence of the key on the length of the message is provided by a dependence of the key on:
        the number of times the symbol to be inserted has already been inserted into other regions, and
        the ranking of the symbol among the ordered symbols.

7. A programmed computer according to claim 6, further comprising means for prior transformation of the digital data by a reversible transformation.

8. A programmed computer according to claim 6, wherein said means for segmenting, associating, determining modulating, and adding are performed by:
    the microprocessor,
    a read-only memory including a program for processing the data, and
    a random-access memory including registers suitable for recording variables modified during running of the program.

9. A computerized apparatus for processing a digital image in order to insert a message into digital data representative of physical quantities, the message including ordered symbols, the apparatus comprising a microprocessor programmed to:
    segment the data into regions; and
    associate at least one region with each symbol to be inserted, wherein, for each region into which a symbol in question is to be inserted, the microprocessor is programmed to:
        determine a pseudo-random function, from a key which depends on an initial key and on a length of the message,
        modulate the symbol in question by the previously determined pseudo-random function in order to supply a pseudo-random sequence, and
        add the pseudo-random sequence to the region in question,
    wherein the dependence of the key on the length of the message is provided by a dependence of the key on:

a number of times the symbols to be inserted has already been inserted into other regions, and a ranking of the symbol among the ordered symbols.

10. A computer-readable storage medium storing a computer program with executable instructions for causing a computer to perform a method of inserting a message into digital data representative of physical quantities, the message including ordered symbols, wherein the method comprises:

segmenting the data into regions; and associating al least one region with each symbol to be inserted, wherein, for each region into which a symbol in question is to be inserted, said method includes the steps of:

determining a pseudo-random function, from a key which depends on an initial key and on a length of the message, modulating the symbol in question by the previously determined pseudo-random function in order to supply a pseudo-random sequence, and adding the pseudo-random sequence to the region in question, wherein the dependence of the key on the length of the message is provided by a dependence of the key on:

a number of times the symbol to be inserted has already been inserted into other regions, and a ranking of the symbol among the ordered symbols.

* * * * *